US 7,212,103 B2

(12) United States Patent
Oyagi et al.

(10) Patent No.: US 7,212,103 B2
(45) Date of Patent: May 1, 2007

(54) MONITOR SYSTEM, CENTRAL MONITOR APPARATUS, ON-VEHICLE MONITOR APPARATUS, MONITOR METHOD, MONITOR PROGRAM, COMPUTER-READABLE RECORDING MEDIUM CONTAINING THE SAME

(75) Inventors: Masayuki Oyagi, Kyoto (JP); Hideyuki Kobayashi, Kyoto (JP); Tanichi Ando, Kyoto (JP)

(73) Assignee: Omron Corporation, Kyoto-Shi (JP)

( * ) Notice: Subject to any disclaimer, the term of this patent is extended or adjusted under 35 U.S.C. 154(b) by 254 days.

(21) Appl. No.: 10/487,812

(22) PCT Filed: Aug. 20, 2002

(86) PCT No.: PCT/JP02/08393

§ 371 (c)(1),
(2), (4) Date: Jul. 29, 2004

(87) PCT Pub. No.: WO03/035437

PCT Pub. Date: May 1, 2003

(65) Prior Publication Data

US 2004/0246111 A1    Dec. 9, 2004

(30) Foreign Application Priority Data

Aug. 27, 2001   (JP) ............................ 2001-256954

(51) Int. Cl.
*B60R 25/10* (2006.01)

(52) U.S. Cl. .................................. 340/429; 340/426.19

(58) Field of Classification Search ............. 340/426.1, 340/429, 426.19, 426.18, 426.22, 426.24; 180/287

See application file for complete search history.

(56) References Cited

U.S. PATENT DOCUMENTS 5,243,322 A * 9/1993 Thompson et al. ......... 340/429

(Continued)

FOREIGN PATENT DOCUMENTS

EP    0 635 732 A1    1/1995

(Continued)

*Primary Examiner*—Brent A. Swarthout
(74) *Attorney, Agent, or Firm*—Foley & Lardner LLP (57) ABSTRACT

A monitoring system which can monitor a plurality of vehicles (1) includes vibration sensing units (15) each sensing a vibration of the associated vehicle (1), a sensed time specifying unit (20b) which specifies an instant at which the vibration of the vehicle (1) is sensed by the vibration sensing unit, and an abnormality determining unit (20a) which determines, when a vibration of one of the vehicles (1) is sensed by the associated vibration sensing unit (15), whether the vibration is caused by preparations for theft with respect to the vehicle (1) or the vibration is caused by environmental influences on the vehicle (1). The abnormality determining unit (20a) carries out the determination on ground of sensing results obtained by the vibration sensing units (15) of the respective vehicles (1) and a result of specification carried out by the sensed time specifying unit (20b). With this, a possibility of incorrectly identifying a vibration not being attributed to preparations for theft as a vibration attributed to preparations for theft.

15 Claims, 5 Drawing Sheets

U.S. PATENT DOCUMENTS

| | | | |
|---|---|---|---|
| 5,532,670 A * | 7/1996 | Issa et al. ................... 340/429 |
| 5,801,618 A | 9/1998 | Jenkins |
| 5,886,622 A | 3/1999 | Snyder |
| 5,910,763 A | 6/1999 | Flanagan et al. |
| 6,084,510 A | 7/2000 | Limelson et al. |
| 6,087,936 A * | 7/2000 | Woods ...................... 340/566 |
| 6,138,516 A * | 10/2000 | Tillman ....................... 73/649 |
| RE38,378 E * | 1/2004 | Montague .............. 340/426.19 |
| 6,720,875 B2 * | 4/2004 | Philippe .................... 340/541 |
| 6,791,456 B2 * | 9/2004 | Nakayama et al. ......... 340/429 |
| 6,956,473 B2 * | 10/2005 | Hanood ..................... 340/522 |

FOREIGN PATENT DOCUMENTS

| | | |
|---|---|---|
| EP | 1 018 457 A1 | 7/2000 |
| JP | 4-277898 A | 10/1992 |
| JP | 11-198764 A | 7/1999 |
| JP | 2000-348263 A | 12/2000 |
| JP | 2001-191901 A | 7/2001 |

* cited by examiner

FIG. 2

MONITOR SYSTEM, CENTRAL MONITOR APPARATUS, ON-VEHICLE MONITOR APPARATUS, MONITOR METHOD, MONITOR PROGRAM, COMPUTER-READABLE RECORDING MEDIUM CONTAINING THE SAME

TECHNICAL FIELD

The present invention relates to a monitoring system, central monitoring apparatus, and on-board monitoring apparatus for monitoring a vehicle to sense the occurrence of an abnormality concerning the vehicle.

BACKGROUND ART

Monitoring systems (antitheft systems) for monitoring a vehicle to prevent theft have been developed to this day. Such a monitoring system is, for instance, arranged in such a manner that, a vibration sensor is attached to a vehicle, and when vibration of the vehicle is sensed, it is assumed that someone is preparing theft (preparations for theft), so that a warning such as blowing a horn is performed.

However, only the result of sensing by the vibration sensor is usually not enough to precisely determines whether the vehicle is vibrating due to the preparations for theft or the vehicle is vibrating due to other reasons. For this reason, warnings are frequently performed by mistake. Conceivable reasons of the vibration of a vehicle other than the preparations for theft are such as an earthquake and construction works. In this wise, a monitoring system which is likely to perform mistaken warnings is untrustworthy.

There is a method in view of the problem above, which is arranged such that a determination is made in consideration of information other than the information from the vibration sensor of the vehicle. For instance, in regard to earthquake, there are institutions for collecting information regarding vibration caused by extensive earthquakes, so that the determination can be made in consideration of the vibration caused by the earthquake, when the information can be obtained from the institutions.

Also, there is another method disclosed by, for instance, Japanese Laid-Open Patent Application No. 2000-348263 (Tokukai 2000-348263; published on Dec. 15, 2000), for determining whether or not a vibration is attributed to an act of thievery (preparations for theft), on ground of an waveform of the vibration sensed by a sensor (vibration sensor).

However, even if such a method that takes the information from the institutions into consideration can determine whether or not a vibration is attributed to an earthquake, other types of information concerning, for instance, an abnormal vibration in a parking lot where the car is left, a vibration due to construction works, and an influence of local wind are hardly obtainable from the institutions, thereby being hardly taken into consideration.

Furthermore, according to the determining method on ground of the waveform of a vibration, there could be a case that it is hardly determinable whether or not the vibration is due to preparations for theft.

In this manner, since conventional arts cannot steadily deliver precise determinations, it has been demanded to further improve the precision of determinations.

The present invention is done to solve the problem above, and thus the objective of the present invention is to provide a monitoring system, central monitoring apparatus, and on-board monitoring apparatus, which can reduce the possibility of misidentifying a vibration, which is of no concern with preparations for theft, as a vibration due to preparations for theft.

DISCLOSURE OF INVENTION

To achieve the objective above, a monitoring system of the present invention, which is for monitoring vehicles in order to sense the occurrence of an abnormality, comprises: vibration sensing units each of which is attached to a different one of the vehicles and senses a vibration of that vehicle; a sensed time specifying unit which specifies a time at which a vibration is sensed by one of the vibration sensing units; and an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination on ground of sensing results obtained by the respective vibration sensing units of the vehicles and a result of specification by the sensed time specifying unit.

According to this, when one of the vehicles (i.e. a target vehicle) senses a vibration, it is determined whether the vibration is caused by preparations for theft vis-à-vis the target vehicle or the vibration of the vibration is caused by environmental influences on the target vehicle, on ground of sensing results of vibrations of the other vehicles and sensed instants at which the vibrations are sensed (abnormality determination). As a result of this, it is determined that the vibration is caused by environmental influences on the target vehicle when a plurality of the vehicles sense vibrations at about the same time, while it is determined that the vibration is caused by preparations for theft vis-à-vis the target vehicle when none of the other vehicles has not sensed a vibration. On this account, it is possible to reduce the possibility of incorrectly identifying a vibration not being attributed to preparations for theft as a vibration attributed to preparations for theft.

It is preferable that the above-described monitoring system of the present invention further comprises a vehicle position specifying unit which specifies positions of the vehicles, the abnormality determining unit performing the determination further on ground of a result of specification by the vehicle position specifying unit.

When vehicles being monitored are in a relatively narrow area, abnormalities can be correctly identified without taking the positions of the vehicles into consideration. This is because vibrations of these vehicles in a narrow area, which are caused by, for instance, an earthquake, occur in much the same way. In the meantime, when the vehicles being monitored are spread in a relatively wide area, it is preferable that the identification of abnormalities is carried out taking the positions of the vehicles into consideration. For instance, when the vibration sensed by the target vehicle is caused by an earthquake, a vehicle geographically distant from the target vehicle may not sense vibration. This is because, if the identification of abnormalities is carried out on ground of the number of the vehicles sensed vibrations and without taking the positions of the vehicles into consideration, an abnormality may be mistakenly identified. The arrangement above makes it possible to reduce such a possibility of mistake and thus increase the credibility of the abnormality determination.

There is also a case that vehicles vibrate due to a local vibration caused by reasons such as construction works. In this case, only the vehicles in a narrow area sense vibrations. In the arrangement above, the positions of the vehicles are taken into consideration so that it is possible to reduce the possibility that a vibration of a vehicle due to a local vibration is mistakenly identified as a vibration caused by preparations for theft.

It is preferable that the above-described monitoring system of the present invention further comprises: a time information generating unit which generates time information indicating time; and a vibration determining unit which adjusts, when a vibration of one of the vehicles is sensed by the associated vibration sensing unit, determination standards for determining whether or not the vibration is ignored, on ground of a sensing result from said one of the vehicles, when the abnormality determining unit determines that a vibration of one of the vehicles sensed by the associated vibration sensing unit is caused by the environmental influences on said one of the vehicles, the vibration determination standard adjusting unit adjusting the determination standards, on ground of a result of specification by the sensed time specifying unit, a result of specification by the vehicle position specifying unit, and the time information.

According to this arrangement, it is possible to dynamically adjust the determination standards utilized for determining whether or not the sensed vibration is ignored, i.e. whether or not the sensed vibration is regarded not to be sensed. Furthermore, this adjustment can be done dynamically with respect to time and on ground of a time at which the vibration is sensed and a position where the sensing is carried out, when the vibration is determined as environment-driven. With this, on the occasion of, for instance, sensing a vibration due to an earthquake, the determination standards of the other vehicles having not sensed vibrations are adjusted in preparation for the soon-to-come vibrations, causing the vibrations which will be sensed by the other vehicles not to be determined as those caused by preparations for theft.

The above-described monitoring system of the present invention is preferably arranged in such a manner that the abnormality determining unit assumes whether or not vibrations of the vehicles are caused by an identical reason, by comparing the vibrations on ground of sensing results obtained by the respective vibration sensing units of the vehicles, and the determination is carried out in accordance with a result of assumption.

According to this, a more precise determination is realized by assuming, by comparing the vibrations, whether or not vibrations of the vehicles are caused by an identical reason, and carrying out the determination on ground of the result of the assumption.

It is preferable that the above-described monitoring system of the present invention further comprises: an abnormality handling unit which handles, when an abnormality occurs in one of the vehicles, the abnormality; and an abnormality handling control unit which controls abnormality handling by the abnormality handling unit, on ground of a determination result obtained by the abnormality determining unit.

According to this arrangement, the abnormality handling is controlled in accordance with the result of the abnormality determination, so that an unnecessary abnormality handling such as warning can be avoided on occasion when, for instance, no preparations for theft have been done.

It is preferable that the above-described monitoring system of the present invention further comprises a reporting unit which reports, when the abnormality determining unit determines that a vibration of one of the vehicles sensed by the associated vibration sensing unit is caused by environmental influences on said one of the vehicles, a determination result to an outside.

According to this arrangement, when there is a possibility that a vehicle vibrates due to environmental influences on the vehicle, the occurrence of the vibration is reported to outside institutions. This report can be effectively utilized by the institutions.

A central monitoring apparatus of the present invention, which is for monitoring vehicles in order to sense the occurrence of an abnormality, comprises: a receiving unit which receives a sensing result from vibration sensing units each of which is provided in a different one of the vehicles in order to sense a vibration of that vehicle; a sensed time specifying unit for specifying a time at which a vibration is sensed by one of the vibration sensing units; and an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination on ground of sensing results obtained by the respective vibration sensing units of the vehicles and a result of specification by the sensed time specifying unit.

Furthermore, an on-board monitoring apparatus of the present invention, which is attached to a vehicle and monitors the vehicle in order to sense the occurrence of an abnormality in the vehicle, comprises: a vibration sensing unit which senses a vibration of the vehicle; a receiving unit which receives a sensing result, which is obtained by a vibration sensing unit of another vehicle, from a central monitoring apparatus which collects and transmits the sensing result obtained by the vibration sensing unit of said another vehicle; a sensed time specifying unit which specifies times at which respective vibrations are sensed by the vibration sensing unit of the vehicle and the vibration sensing unit of said another vehicle; and an abnormality determining unit which determines, when the vehicle senses a vibration by the vibration sensing unit, whether the vibration is caused by preparations for theft vis-à-vis the vehicle or the vibration is caused by environmental influences on the vehicle, the abnormality determining unit performing a determination on ground of a sensing result obtained by the vibration sensing unit of the vehicle, the sensing result obtained by the vibration sensing unit of said another vehicle, and a result of specification by the sensed time specifying unit.

As is the case with the above-mentioned monitoring system, the central monitoring apparatus and the on-board monitoring apparatus can also reduce the possibility of incorrectly identifying a vibration not being attributed to preparations for theft as a vibration attributed to preparations for theft.

For a fuller understanding of the nature and advantages of the invention, reference should be made to the ensuing detailed description taken in conjunction with the accompanying drawings.

BEST MODE FOR CARRYING OUT THE INVENTION

One embodiment of the present invention is described below with reference to FIGS. 1–5.

Figure 2:
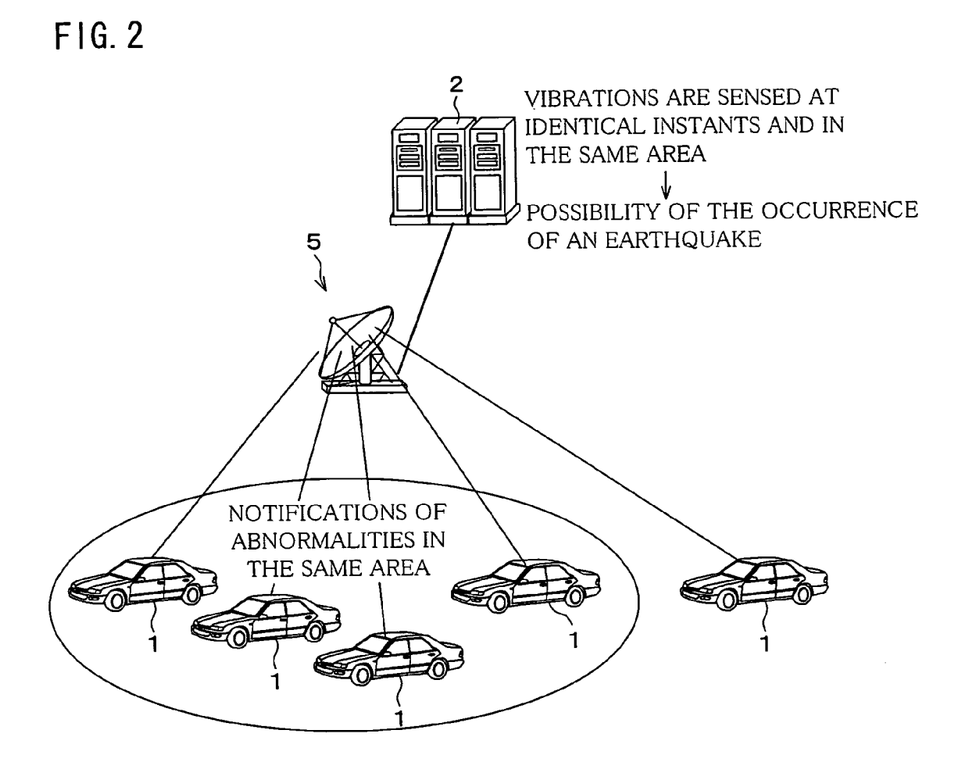
FIG. 2 is a conceptual diagram, illustrating a concept of the monitoring system in FIG. 1.

FIG. 2 is a schematic diagram illustrating a concept of a monitoring system (hereinafter, present monitoring system) in accordance with the present embodiment. The present monitoring system is arranged in such a manner that a central monitoring apparatus 2 monitors a plurality of vehicles 1 through the intermediary of a communications network 5. The monitoring system detects abnormalities concerning the vehicles 1, and particularly detects preparations for theft vis-à-vis the vehicles. The preparations for theft are effectively detected by sensing the vibration of the vehicle 1. However, as described in BACKGROUND ART, such s vibration of the vehicle 1 is caused not only by preparations for theft but also by environmental influences on the vehicle 1. This causes erroneous determinations by the monitoring system.

To solve this problem, the present monitoring system reduces the possibility of erroneous determinations, by utilizing sets of information from other vehicles 1 in the same area, i.e. sets of information from nearby vehicles 1. That is to say, in each of the vehicles 1, information from, for instance, a vibration sensor which is attached to the vehicle and senses a vibration is sent to the central monitoring apparatus 2 in conjunction with positional information of the vehicle. The central monitoring apparatus 2 then examines the sets of information from the vehicles 1 with reference to the sets of positional information thereof, so as to grasp the circumstances in the area. With this method, all types of information, from local information to extensive information, concerning with vibrations which can be sensed by the vibration sensors of the vehicles 1 can be collected. The type of abnormalities regarding the vehicle 1 is determined in accordance with the above-described information, so that the possibility of erroneous determinations can be reduced.

Note that, any types of vehicles such as passenger cars, trucks, buses, motorbikes, bicycles, railway cars, and construction machines (including non-self-propelled machines) are denoted by "vehicle". Hereinafter, descriptions are given on the assumption that "vehicle" denotes a passenger car.

Figure 1:
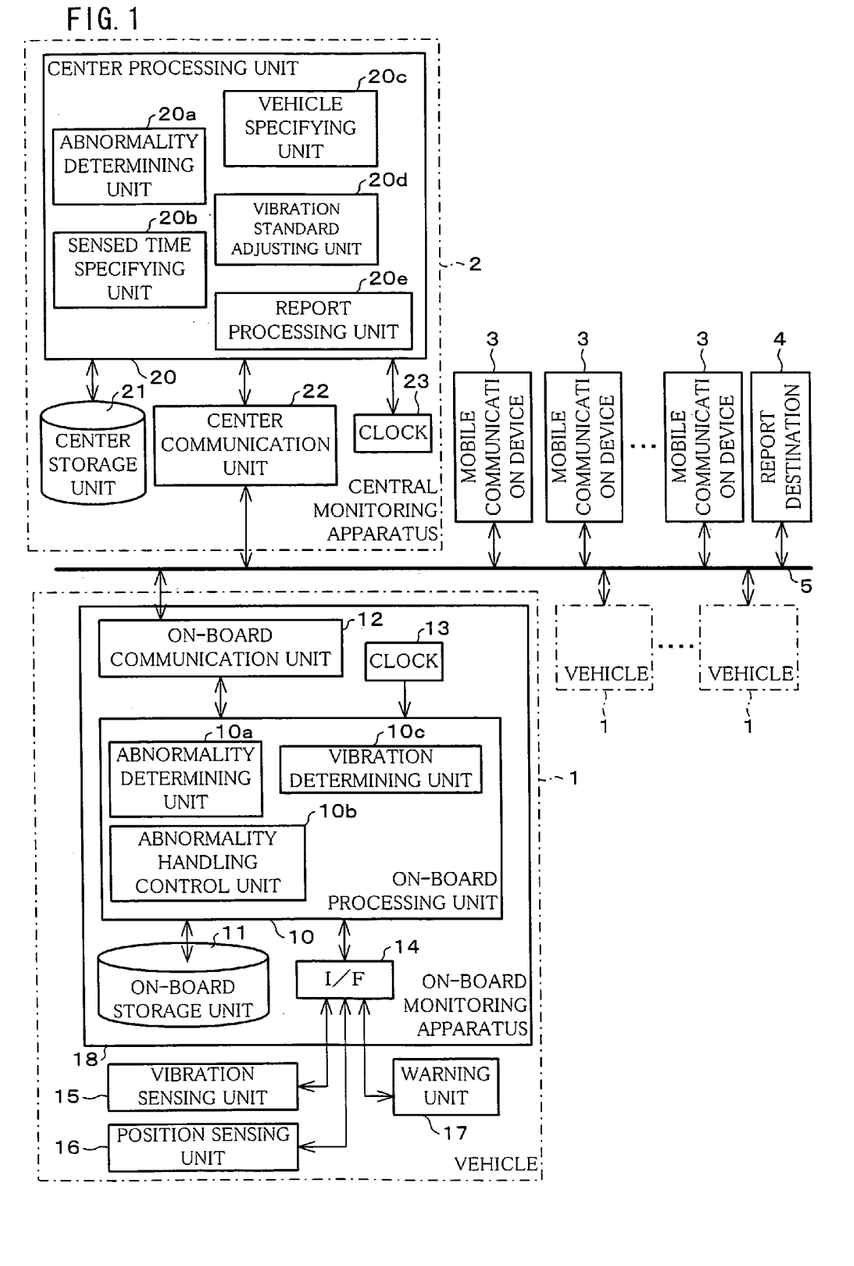
FIG. 1 is a block diagram, showing a concrete example of a monitoring system in accordance with an embodiment of the present invention.

FIG. 1 is a block diagram showing a concrete example of the present monitoring system (event identification system). The present monitoring system is made up of a plurality of vehicles (objects) 1, mobile communication devices 3 corresponding to the respective vehicles 1, a central monitoring apparatus (central event identification apparatus, central apparatus) 2 for monitoring the plurality of vehicles 1, and a communications network 5. Note that, a report destination 4 is not a part of the present monitoring system, thereby being described later. The vehicles 1, central monitoring apparatus 2, mobile communication devices 3, and report destination 4 can be connected to the communications network 5, and thus can communicate with each other through the intermediary of the communications network 5. It is noted that, however, the communications between these members are not necessarily carried out through the communications network 5. The vehicle 1, for instance, may directly communicate with the central monitoring apparatus 2 by radio.

The communications network 5 in the present case is a telephone communications network including a wire telephone communications network and a wireless telephone communications network. The vehicles 1 and the mobile communication devices 3 are connected to the wireless telephone communications network, while the central monitoring apparatus 2 and report destination 4 are connected to the wire telephone communications network. Note that, the communications network 5 is not limited to the above, and hence may include the Internet.

The vehicle 1 includes a vibration sensing unit 15 (sensing unit), position sensing unit 16, warning unit (abnormality handling unit) 17, and on-board monitoring apparatus 18 (on-board event identification apparatus).

The vibration sensing unit 15 is a sensor for sensing a vibration (event) of (including an impact on) the vehicle 1. The vibration sensing unit 15 in this case includes an acceleration sensor which senses a vibration as an acceleration and outputs the sensing result as an electrical signal. Note that, however, any types of sensors can be adopted as a sensor in the vibration sensing unit 15, on condition that a physical quantity correlated to a vibration is sensed and a signal indicating the sensing result is outputted.

The position sensing unit 16 is equipped with a GPS (Global Positioning System) function utilizing surveyed positional information from satellites and a position sensing function utilizing information from base stations of the wireless telephone communications. The position sensing unit 16 thus senses current positional information of the vehicle 1, and determines a current position of the vehicle 1 as, for instance, a latitude and a longitude.

The warning unit 17 is, for instance, a horn which is a standard equipment of the vehicle 1, for, for instance, producing a sound and warning a parson making preparations for theft.

The on-board monitoring apparatus 18 is made up of an on-board processing unit 10, on-board storage unit 11, on-board communication unit 12, clock 13, and interface 14 which are connected with each other via a bus (not illustrated).

The on-board processing unit 10 is, for instance, made up of a micro computer. The on-board processing unit 10 controls the on-board storage unit 11, on-board communication unit 12, and interface 14, and exchanges various types of information with the on-board storage unit 11, on-board communication unit 12, clock 13, and interface 14. The on-board processing unit 10 also carries out processes based on programs and data stored in the on-board storage unit 11 so as to function as an abnormality determining unit 10a, abnormality handling control unit 10b, and vibration determining unit 10c. The operations of these functional blocks will be discussed later.

The on-board storage unit 11 is made up of a publicly-known memory such as RAM (Random Access memory) and ROM (Read Only Memory) and a publicly-known recording device typified by a magnetic disk drive and optical disk drive, and thus stores various kinds of information under the control of the on-board processing unit 10. The on-board storage unit 11 stores programs and data for causing the on-board processing unit 10 to function as the abnormality determining unit 10a, abnormality handling control unit 10b, and vibration determining unit 10c. Furthermore, the on-board storage unit 11 temporarily stores information transmitted or received by the on-board communication unit 12, information concerning the sensing result from the vibration sensing unit 15, and information concerning the sensing result from the position sensing unit 16.

The on-board communication unit 12 is provided for carrying out communications with the outside of the vehicle 1 under the control of the on-board processing unit 10, and functions as an interface for exchanging information with the central monitoring apparatus 2 and mobile communication device 3. In the present case, the on-board communication unit 12 carries out the information exchange by a packet-based wireless telephone communications network. When using this network, the charge is made for the number of packets used for information transmission even if the on-board communication unit 12 is virtually always-connected with the central monitoring apparatus 2 and mobile communication device 3, so that intermittent information transmission carried out by the on-board monitoring apparatus 18 is efficiently and economically done.

The clock 13 generates time information on a particular instant, and the time information is read out by the on-board processing unit when necessary.

The interface 14 is an interface for the communications between the on-board monitoring apparatus 18 and the vibration sensing unit 15, position sensing unit 16, and warning unit 17 which are provided outside the on-board monitoring apparatus 18.

With the configuration above, any one of a normal mode, monitor mode (alert mode), and abnormality handling mode is set in the vehicle 1. The normal mode is set in such an occasion that the user drives the vehicle 1, and the monitoring of the vehicle 1 is removed in this mode. The monitor mode is set in such an occasion that the user leaves the vehicle 1, and in this mode a vibration of the vehicle 1 is sensed by the vibration sensing unit 15. The abnormality handling mode is set in such an occasion that the vibration of the vehicle 1 is sensed by the vibration sensing unit 15 and the vibration is identified as the result of preparations for theft, and in this mode a warning with respect to the suspected is carried out using the warning unit 17 in order to obviate the theft. These modes are switched under the control of the on-board processing unit 10.

The central monitoring apparatus 2 is made up of a center processing unit 20, center storage unit 21, center communication unit 22, and clock 23 connected with each other through the intermediary of a bus (not illustrated).

The center processing unit 20 is made up of, for instance, a microcomputer. The center processing unit 20 controls the center storage unit 21 and center communication unit 22, and also exchanges various types of information with the center storage unit 21, center communication unit 22, and clock 23. Furthermore, the center processing unit 20 carries out processes based on programs and data stored in the center storage unit 21, so as to function as an abnormality determining unit 20*a* (determining unit), sensed time specifying unit 20*b*, vehicle position specifying unit 20*c* (position specifying unit), vibration determination standard adjusting unit 20*d*, and report processing unit 20*e*. Operations of these functional blocks will be discussed later.

The center storage unit 21 is made up of a publicly-known memory such as RAM (Random Access memory) and ROM (Read Only Memory) and a publicly-known recording device typified by a magnetic disk drive and optical disk drive, and thus stores various kinds of information under the control of the center processing unit 20. The center storage unit 21 stores programs and data for enabling the center processing unit 20 to function as the abnormality determining unit 20*a*, sensed time specifying unit 20*b*, vehicle position specifying unit 20*c*, vibration determination standard adjusting unit 20*d*, and report processing unit 20*e*. The center storage unit 21 also temporarily stores information sent or received by the center communication unit 22.

The center communication unit 22 is provided for carrying out communications with the outside of the central monitoring apparatus 2 under the control of the center processing unit 20, and functioning as an interface for exchanging information with the vehicle 1 and report destination 4.

The clock 23 generates time information on a particular instant, and the time information is read out by the center processing unit 20 when necessary.

The mobile communication device 3 is, for instance, a mobile phone possessed by the owner of the vehicle 1, and includes a browser which can transmit a command for switching between the normal mode, monitor mode, and abnormality handling mode of the vehicle 1. The command is transmitted to the central monitoring apparatus 2 through the intermediary of the communications network 5. In the central monitoring apparatus 2, the center communication unit 22 receives the command, and the center processing unit 20 identifies which one of the vehicles 1 is subjected to the mode switching and to which mode the current mode is switched. The result of the identification is then stored in the center storage unit 21. With this, the central monitoring apparatus 2 can always grasp which modes are set in the respective vehicles 1 at a certain instant.

The center processing unit 20 also transmits a command for the mode switching to the vehicle 1 which is an object of the mode switching. The vehicle 1 receives the commend by the on-board communication unit 12, so that the mode switching is carried out in accordance with the command and under the control of the on-board processing unit 10. In other words, the central monitoring apparatus 2 remotely switches between the modes set in the vehicle 1.

The report destination 4 is an entity to which, when the cause of a vibration sensed in the vehicle 1 is determined as environmental influences on the vehicle 1, the result of determination is reported as occasion demands.

Figure 3:
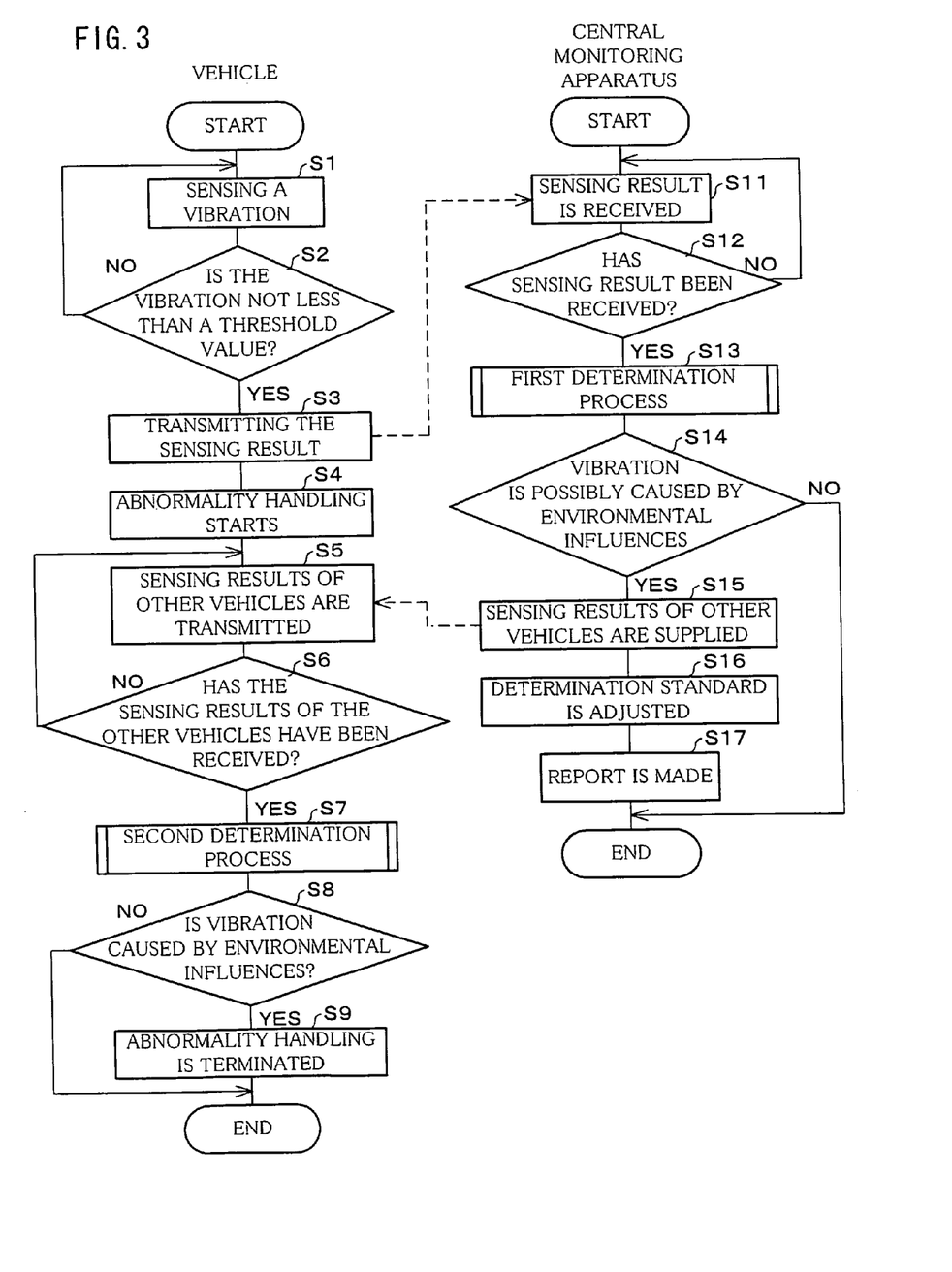
FIG. 3 is a flowchart of the flow of processes in the monitoring system in FIG. 1.

FIG. 3 is a flowchart of the flow of processes in the present monitoring system. Note that, the flowchart in FIG. 3 shows processes in the vehicle 1 and the central monitoring apparatus 2 after setting the monitor mode in the vehicle 1 by the mobile communication device 3. Also, hereinafter, the vehicle 1 in question will be referred to as "target vehicle 1" in order to distinguish this vehicle 1 from the other vehicles 1. Dotted arrows in FIG. 3 indicate the directions of information transmissions. Now, the following will describe the operation of the present monitoring system with reference to FIG. 3.

The vehicle 1 is supposed to be immovable when the monitor mode is set in the vehicle 1, and the vibration sensing unit 15 senses all kinds of vibrations of the vehicle 1 until the monitor mode is removed and switched to the normal mode. When the vibration sensing unit 15 senses a vibration of the vehicle 1 (Step S1; vibration sensing step), Vibration information, which is the sensing result, is supplied to the on-board processing unit 10 through the intermediary of the interface 14.

In accordance with the vibration information, the on-board processing unit 10 determines whether or not the occurrence of the vibration is regarded as an abnormality concerning the vehicle 1 (Step S2). On this occasion, the on-board processing unit 10 functions as the vibration determining unit 10*c*. The determination is made on the basis of, for instance, the magnitude of a vibration, so that a vibration with a magnitude not less than a predetermined threshold is regarded as an abnormality of the vehicle 1. Thus, even though a vibration of the vehicle 1 is caused due to reasons such as an earthquake, construction works, strong wind for the reason of, for instance, typhoon, an abnormality is identified if the magnitude of the vibration is not less than a predetermined value.

Note that, the determination standards for the vibration determining units 10c are adjusted to be suitable for the respective vehicles 1, in order to allow the vibration determining units 10c to determine abnormality with reference to substantially identical magnitudes of vibrations. When the vehicles 1 vibrate due to environmental influences on the same, the degrees of the vibrations vary with the vehicles 1. This is because the air pressures of tires and the types of suspensions vary with the vehicles 1. The adjustment of the standard reduces the variation between the respective determinations in the vehicles 1. It is preferable that the standard of vibration is at first has an initial value corresponding to, for instance, the type of the vehicle 1, and then remotely fine-tuned on occasions when, for instance, more than one vehicle 1 sense vibrations due to an identical reason.

If the occurrence of the vibration not less than the threshold value is identified in Step S2, the vibration information concerning this vibration is supplied to the central monitoring apparatus 2 by the on-board communication unit (transmitting unit) 12 (Step S3). In this instance, the vibration information may be transmitted with no modification. Alternatively, the following may be done: The on-board processing unit 10 carries out a predetermined operation with respect to the vibration information so as to convert the same, and this converted vibration information is transmitted. Conceivable examples of the conversion are such that the vibration information is converted to the number of times that the amplitude exceeds a predetermined value within a predetermined period, and the vibration information is converted to one or more parameter by performing a predetermined operation.

Note that, to the vibration information, sensed time information indicating an instant at which a vibration is sensed is added. This sensed time information is obtained from the clock 13 when the on-board processing unit 10 receives the vibration information. To the vibration information, moreover, vehicle-positional information indicating a position of the vehicle 1 is also added. The on-board processing unit 10 obtains this vehicle-positional information from the position sensing unit 16.

Then the on-board processing unit 10 starts to handle the abnormality (Step S4). Handling the abnormality is to warn a parson making preparations for theft, by operating the warning unit 17, to put it concretely, by blowing a horn. On this occasion, the on-board processing unit 10 functions as the abnormality handling control unit 10b. It is noted that, when the vibration of the vehicle 1 is caused by an earthquake or construction works, the abnormality handing is basically unnecessary. However, at this point it has not been determined whether or not the vibration is abnormality vis-à-vis the vehicle 1, so that the abnormality handling is started anyway.

In the meantime, in the central monitoring apparatus 2, the center communication unit 22 (receiving unit) receives the vibration information from the on-board communication unit 12 of the vehicle 1 (Step S11). When the receipt of the vibration information is recognized (Step S12), the center processing unit 20 subjects the vibration information to a first determination process (Step S13). Note that, the central monitoring apparatus 2 receives vibration information from other vehicles 1 in a similar manner.

Figure 4:
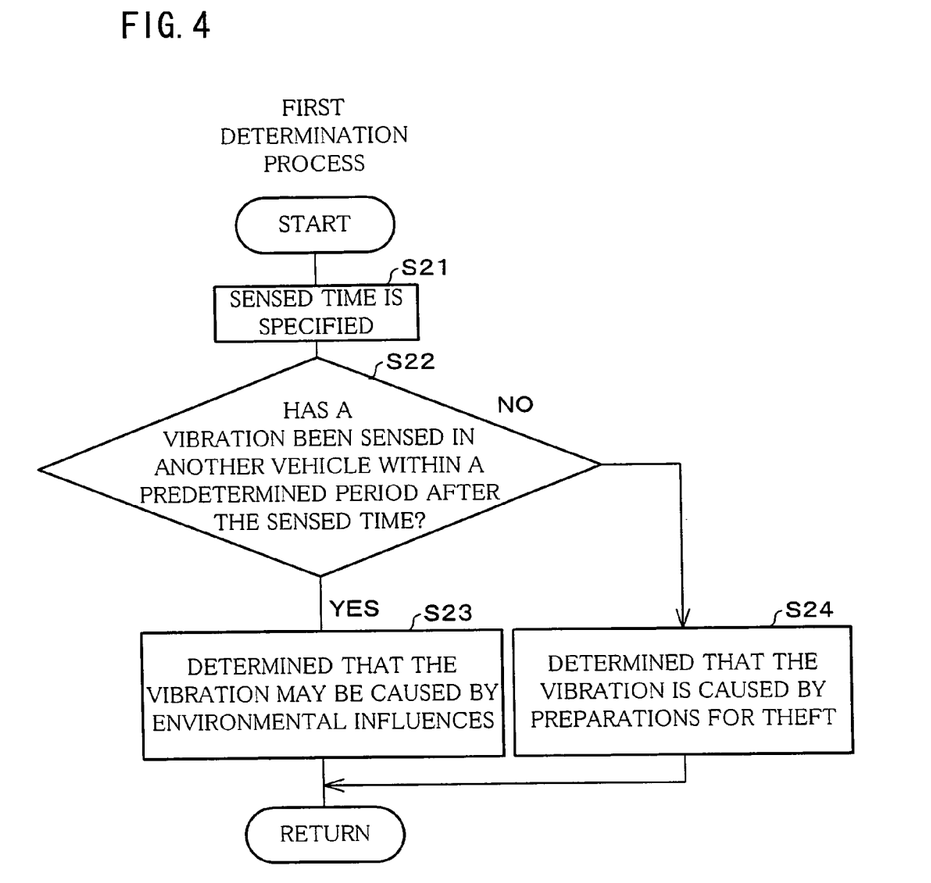
FIG. 4 is a flowchart of a first determination process in the flowchart in FIG. 3.

FIG. 4 is a flowchart of the first determination process. In the first determination process, the center processing unit 20 specifies the instant at which the vibration that is the underlying basis of the vibration information was sensed (Step S21; sensed time specifying step). This instant is specified on ground of the sensed time information included in the vibration information. On this occasion, the center processing unit 20 functions as the sensed time specifying unit 20b.

Then the center processing unit 20 determines whether or not vibrations were sensed in the other vehicles 1 within a predetermined period, on the basis of the instant specified in Step S21 (Step S22). If sensed, the center processing unit 20 determines that the vibration was likely to be caused by environmental influences on the vehicle 1 (Step S23; abnormality determining step). If not sensed, the center processing unit 20 determines that the vibration was caused due to the preparations for theft vis-à-vis the vehicle 1 (Step S24; abnormality determining step). On this occasion, the center processing unit 20 functions here as the abnormality determining unit 20a.

The presence of the vibrations of the other vehicles 1 is specified on ground of the sets of vibration information as the sensing results supplied from the other vehicles 1 in the monitor mode and the instants specified by the vehicle position specifying unit 20b, at which the respective vibrations of the vehicles 1 were sensed. If the vibration information is not supplied from the vehicles 1 in the monitor mode, this fact of no vibration information being supplied is regarded as a sensing result indicating that no vibration has been sensed.

In Step S22, it is preferable that the determination in Step S23 is made on condition that a certain number of vehicles 1 sensed vibrations. This is because, when the number of the vehicles 1 sensing the vibrations is small, there is a possibility that preparations for theft are coincidentally done in different positions at about the same time, so that in such a case it is undesirable to carry out the determination in Step S23.

In Step S22, furthermore, it is preferable that the determination is made in consideration of the position of the target vehicle 1 and the positions of the other vehicles sensing vibrations. To realize this, the center processing unit 20 specifies the positions of the vehicles 1, on ground of the vehicle-positional information included in the vibration information. On this occasion, the center processing unit 20 functions as the vehicle position specifying unit 20b. Referring to the specified positions of the vehicles 1, the determination in Step S23 is carried out if the positions are close to each other, even though the number of the vehicles 1 sensing vibrations is small. This is because, when the vehicles 1 being close to each other vibrate at about the same time, it is assumed that, for instance, these vehicles 1 vibrate due to a nearby construction work or these vehicles are parked in a parking lot in a building (e.g. multistory parking lot) and the building vibrates.

After the completion of the first determination process, the result of the first determination process is examined (Step S14). If the determination in Step S23 has been made, the sets of vibration information sensed in the other vehicles 1 are supplied to the target vehicle 1 by the center communication unit 22 (Step S15).

In the on-board monitoring apparatus 18, the sets of vibration information sensed in the other vehicles 1, which are supplied from the center communication unit 22, are received by the on-board communication unit (receiving unit) 12 (Step S5). When the receipt of the sets of the vibration information is recognized (Step S6), the on-board processing unit 10 subjects the sets of vibration information sensed in the other vehicles 1 to a second determination process (Step S7).

Figure 5:
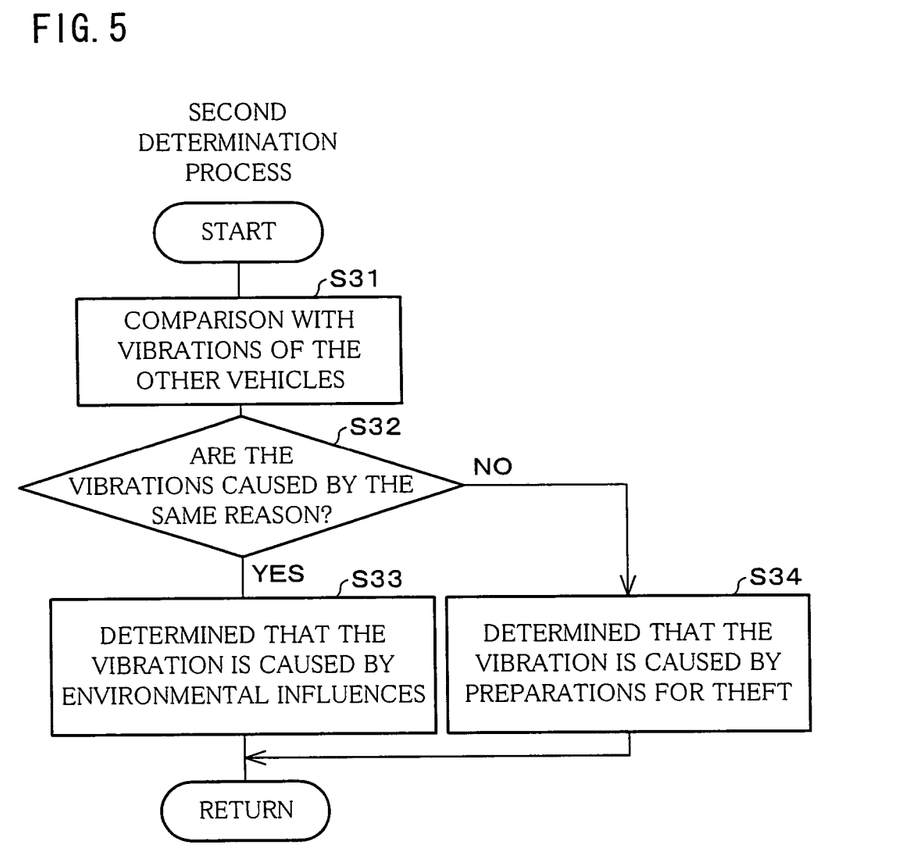
FIG. 5 is a flowchart of a second determination process in the flowchart in FIG. 3.

FIG. 5 is a flowchart of the second determination process. In this second determination process, the on-board processing unit 10 compares the vibration information of the target vehicle 1 with the sets of vibration information sensed in the other vehicles 1 (Step S31), thereby determining whether or not these vibrations are caused by one and the same reason (Step S32). If determined that the vibrations are caused by the same reason, it is determined that the vibration of the target vehicle 1 is caused by environmental influences on the same (Step S33; abnormality determining step), while, if determined that the vibrations are caused by different reasons, it is determined that the vibration of the target vehicle 1 is caused by the preparations for theft with respect to the same (Step S34; abnormality determining step). On this occasion, the on-board processing unit 10 functions as the abnormality determining unit 10a.

A possible example of a method of determining whether or not the vibrations are caused by one and the same reason is such that the magnitudes of the vibrations are compared with each other according to the sets of vibration information thereof, and the cause of the vibrations are determined as the same when the difference between the magnitudes of the vibrations is within a predetermined range (e.g. not more than 10% of an average value).

There is a possible method of making a more precise determination such that acceleration response spectra of the vibrations are figured out on ground of the sets of vibration information thereof, and the determination is done by carrying out a pattern matching between the patterns of the acceleration response spectra. To carry out the pattern matching, there is a conceivable method such that, with regard to the patterns of the acceleration response spectra, the magnitudes of the spectra of the vibrations are compared with each other at several predetermined frequencies. According to this method, when the difference between the spectra at each frequency is within a predetermined range (e.g. 10% of an average value), it is determined that the vibrations are caused by the same reason.

In Step S32, furthermore, the cause(s) of the vibrations may be specified by comparing the patterns of the acceleration response spectra of the vibrations with a template of vibration. For instance, it has been known that the patterns of acceleration response spectra observed in the event of earthquakes are similar to each other to a certain extent, no matter how the intensities of the earthquakes are different. Thus, in some cases it is possible to specify the cause of the vibrations by carrying out a pattern matching between the vibrations using templates generated based on vibrations of the vehicle 1 caused by earthquake or humans.

After completing the second determination process, the result of the second determination process is examined (Step S8). If the determination in Step S33 has been made, the on-board processing unit 10 stops the abnormality handling which was started in Step S4 (Step S9). In other words, the operation of the warning unit 17 is stopped. If the determination in Step S34 has been made, the operation of the warning unit 17 continues.

Note that, in the present case, the first determination process and the second determination process are carried out in the abnormality determining unit 20a of the central monitoring apparatus 2 and the abnormality determining unit 10a of the on-board monitoring apparatus 1, respectively. With this, it is possible to cause the on-board processing unit 10 of each vehicle 1 to carry out a part of the determining process. Thus, it is possible to reduce the number of processes to be carried out in the center processing unit 20, so as to reduce the load on the center processing unit 20.

Being alternative to the above, the first determination process and the second determination process may be carried out in the abnormality determining unit 20a of the central monitoring apparatus 2. In this case, the central monitoring apparatus 2 sends the determination result of the second determination process to the vehicle 1. Also, the first determination process and the second determination process may be carried out in the abnormality determining unit 10a of the on-board monitoring apparatus 1. In this case, the sensed time specifying unit 20 and the vehicle position specifying unit 20c are realized by the on-board processing unit 10 as well, and the central monitoring apparatus 2 collects the sets of vibration information from the other vehicles 1 and send these sets to the target vehicle 1.

After Step S15, the center processing unit 20 of the central monitoring apparatus 2 adjusts a determination standard used in the vibration determining unit 10c of the vehicle 1 which does not sense vibration (Step S16). On this occasion, the center processing unit 20 functions as the vibration determination standard adjusting unit 20d.

If the determination in Step S23 has been made, there is a possibility that the target vehicle 1 vibrates due to an earthquake. When the earthquake is strong, positions distant from the target vehicle 1 are also influenced by the earthquake after a certain period of time has passed. To take this into consideration, the determination standards of the other vehicles 1 having not sensed vibrations are adjusted in order to ignore the vibrations to be sensed, which will be caused by the soon-to-come earthquake.

This adjustment is carried out dynamically with respect to time, on ground of the position of the target vehicle 1 (vehicle-positional information), the instant at which the vibration is sensed in the target vehicle 1 (sensed time information), the position of the vehicle 1 which is the target of the adjustment (vehicle-positional information), and time information obtained from the clock 23 (time information generating unit). That is to say, since the arrival time of the vibration of the earthquake varies in accordance with the distance between the position of the target vehicle 1 and the position of the vehicle 1 to be subjected to the adjustment, the arrival time is calculated on ground of the time at which the target vehicle 1 sensed the vibration and the positions of the target vehicle 1 and the vehicle 1 to be subjected to the adjustment. With this, the sensing result of the vibration being arrived is nullified by raising the determination standard for certain periods before and after the arrival time.

The above-described adjustment is, moreover, preferably further based on information regarding the magnitude of a vibration, which is included in the vibration information from the target vehicle 1. With this, it is possible to optimize the range of adjustment of the determination standard, in accordance with the distance between the position of the target vehicle 1 and the position of the vehicle 1 to be subjected to the adjustment.

After Step S16, the center processing unit 20 of the central monitoring apparatus 2 sends the determination result of the first determination process and the sets of vibration information from the vehicles 1 to the report destination 4 through the intermediary of the center communication unit 22. On this occasion, the center processing unit 20 functions as the report processing unit 20e, and the report processing unit 20e and the center communication unit 22 constitutes a reporting unit.

If the determination in Step S23 has been made, there is a possibility that the vibration was caused by environmental influences on the target vehicle 1. Thus, reporting the occurrence of the vibration to external institutions may be beneficial in some cases. For instance, the occurrence of a vibration due to an earthquake is reported to a railway control center and a traffic control center for helping them to carry out railway and traffic controls, and the occurrence of a vibration due to an explosion is reported to a police station and a fire department in order to help them to grasp the emergency situation. Information regarding an earthquake is also provided by meteorological observatories, but in general, vibrations such as those due to an explosion is difficult to grasp.

As described above, the present monitoring system is provided for monitoring a vehicle 1 in order to detect the occurrence of an abnormality in the vehicle 1, and a plurality of vehicles 1 can be monitored at a time. The present monitoring system includes: the vibration sensing units 15 each being attached to a different one of the vehicles 1 and sensing the vibration of the vehicle 1; the sensed time specifying unit 20b which specifies the instant at which the vibration is sensed by the vibration sensing unit 15 of the vehicle 1; and the abnormality determining units 10a and 20a each determining, when the vibration is sensed by the vibration sensing unit 15 of the vehicle 1, whether the vibration is caused by the preparations for theft with respect to the vehicle 1 or the vibration is caused by environmental influences on the vehicle 1. Each of the abnormality determining units 10a and 20a carries out the determination on ground of the sensing results from the vibrating sensing units 15 of the vehicles 1 and the result of the specification carried out by the sensed time specifying unit 20b.

In this arrangement, when more than one vehicle 1 sense vibrations at about the same time, it is determined that the vibrations are caused by environmental influences on the vehicles 1, such as an earthquake. Meanwhile, when the other vehicles 1 have not sensed vibrations, it is determined that the vibration is caused by the preparations for theft. As a result, it is possible to reduce the possibility of mistakenly assuming vibrations not caused by preparations for theft as vibrations caused by preparations for theft.

When the vehicles 1 are in a relatively narrow area, abnormalities can be correctly identified without taking the positions of the vehicles 1 into consideration. This is because vibrations of these vehicles 1 in a narrow area, which are caused by, for instance, an earthquake, occur in much the same way. In the meantime, when the vehicles 1 are spread in a relatively wide area, it is preferable that the identification of abnormalities is carried out taking the positions of the vehicles into consideration. For instance, when a vibration sensed by the target vehicle 1 is caused by an earthquake, the other vehicles 1 being far away from the target vehicle 1 may not sense vibrations. In such a case, an abnormality may be mistakenly identified if the identification of abnormalities is carried out on ground of the number of the vehicles 1 sensed vibrations, without taking the positions of the vehicles into consideration.

To solve this problem, it is preferable that the present monitoring system further includes the vehicle position specifying unit 20c which specifies the positions of the vehicles 1, and each of the abnormality determining units 10a and 20a carries out the determination on ground of the result of the specification by the vehicle position specifying unit 20c. With this, the possibility of wrong determinations is reduced so that the reliability of the determinations is improved. There is such a case that the vehicles 1 vibrate due to a local vibration caused by, for instance, construction works. On this occasion, only the vehicles 1 in a narrow area sense vibrations. Taking the positions of the vehicles 1 into consideration makes it possible in the above-mentioned case to reduce the possibility of a wrong determination that the vehicle vibrates due to preparations for theft.

The present monitoring system preferably further includes: the abnormality handling unit for handling abnormalities regarding the vehicles 1; and the abnormality handling control unit 10b for controlling the abnormality handling which is carried out by the abnormality handing unit, on ground of the determination results from the abnormality determining units 10a and 20a. An example of the abnormality handling unit is the warning unit 17. When this warning unit 17 is adopted, the abnormality handling is controlled on ground of the determination results from the abnormality determining units 10a and 20a, so that, for instance, unnecessarily carrying out the abnormality handling such as warning can be avoided when no preparations for theft have actually been done. Note that, the abnormality handling control unit 10b and the abnormality handling unit may have such a function that, when the vibration sensing unit 15 senses a particularly strong vibration, the engine of the vehicle 1 is caused not to start up on the assumption that a major earthquake occurred. This makes it possible to prevent the turmoil of vehicles other than emergency vehicles, on the occasion of a major earthquake.

It is also preferable that the present monitoring system further includes: the clock 23 (time information generating unit) for generating time information indicating time; the vibration determining unit 10c, which determines, when vibrations are sensed by the vibration sensing units 15 of the respective vehicles 1, whether or not the vibrations are ignored, on ground of the sensing results from these vehicle 1; and the vibration determination standard adjusting unit 20d for adjusting the determination standard in the vibration determining unit 10c, and the determination standard is adjusted. When it is determined that a vibration sensed by the vibration sensing unit 15 of the vehicle 1 is caused by environmental influences on the vehicle, the vibration determination standard adjusting unit 20c adjusts the determination standard on ground of the result of the specification by the sensed time specifying unit 20b, the result of the specification by the vehicle position specifying unit 20c, and the time information.

This arrangement makes it possible to dynamically adjust the determination standard which is for determining whether or not a sensed vibration is ignored, i.e. whether or not a sensed vibration is assumed not to be sensed. Also, it is possible to carry out this adjustment when being determined that a vibration is caused by environmental influences, so as to dynamically carrying out the adjustment on ground of the instant at which the vibration was sensed and the position where the vibration is sensed. With this, when, for instance, a vibration due to an earthquake is sensed, the determination standards of the other vehicles 1 which have not vibrate due to the earthquake can be adjusted to cope with the soon-to-come earthquake, so that the vibrations are not determined to be caused by preparations for theft when the vibrations reach the other vehicles 1.

Finally, the objective of the present invention can also be realized by the following arrangement: A computer-readable recording medium, in which program codes (an execute form program, intermediate code program, and source program) of a monitoring program for realizing the functions of the above-mentioned monitoring system are recorded, is provided to a system or device, and computers (or a member such as CPU, MPU, and DSP) of respective apparatuses constituting the present monitoring system read out the program codes from the recording medium and execute them. In this case, the program codes read out from the recording medium realize the above-mentioned functions, so that the recording medium recording these codes constitutes the present invention.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

INDUSTRIAL APPLICABILITY

The monitoring system, central monitoring apparatus, and on-board monitoring apparatus can be utilized for a system of monitoring a vehicle in order to sense the occurrence of an abnormality regarding the vehicle.

The invention claimed is:

1. A monitoring system for monitoring vehicles in order to sense the occurrence of an abnormality, comprising:
    vibration sensing units each of which is attached to a different one of the vehicles and senses a vibration of that vehicle;
    a sensed time specifying unit which specifies a time at which a vibration is sensed by one of the vibration sensing units; and
    an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination based on sensing results obtained by the respective vibration sensing units of the vehicles within a predetermined time period and a result of specification by the sensed time specifying unit that more than one of the vibration sensing units senses a vibration within the predetermined time period.

2. A monitoring system for monitoring vehicles in order to sense the occurrence of an abnormality, comprising:
    vibration sensing units each of which is attached to a different one of the vehicles and senses a vibration of that vehicle;
    a sensed time specifying unit which specifies a time at which a vibration is sensed by one of the vibration sensing units;
    an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination based on sensing results obtained by the respective vibration sensing units of the vehicles and a result of specification by the sensed time specifying unit; and
    a vehicle position specifying unit which specifies positions of the vehicles, the abnormality determining unit performing the determination further on based on a result of specification by the vehicle position specifying unit.

3. The monitoring system as defined in claim 2, further comprising:
    a time information generating unit which generates time information indicating time;
    a vibration determining unit which determines, when a vibration of one of the vehicles is sensed by the associated vibration sensing unit, whether or not the vibration is ignored, based on a sensing result of the vibration; and
    a vibration determination standard adjusting unit which adjusts determination standards which are set in the vibration determining unit and correspond to the respective vehicles, when the abnormality determining unit determines that a vibration of one of the vehicles sensed by the associated vibration sensing unit is caused by the environmental influences on said one of the vehicles, the vibration determination standard adjusting unit adjusting the determination standards, based on a result of specification by the sensed time specifying unit, a result of specification by the vehicle position specifying unit, and the time information.

4. A monitoring system for monitoring vehicles in order to sense the occurrence of an abnormality, comprising:
    vibration sensing units each of which is attached to a different one of the vehicles and senses a vibration of that vehicle;
    a sensed time specifying unit which specifies a time at which a vibration is sensed by one of the vibration sensing units; and
    an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination based on sensing results obtained by the respective vibration sensing units of the vehicles and a result of specification by the sensed time specifying unit;
    wherein, the abnormality determining unit assumes whether or not vibrations of the vehicles are caused by an identical reason, by comparing the vibrations based on sensing results obtained by the respective vibration sensing units of the vehicles, and the determination is carried out in accordance with a result of assumption.

5. The monitoring system as defined in claim 1, further comprising:
    an abnormality handling unit which handles, when an abnormality occurs in one of the vehicles, the abnormality; and
    an abnormality handling control unit which controls abnormality handling by the abnormality handling unit, based on a determination result obtained by the abnormality determining unit.

6. The monitoring system as defined in claim 1, further comprising a reporting unit which reports, when the abnormality determining unit determines that a vibration of one of the vehicles sensed by the associated vibration sensing unit is caused by environmental influences on said one of the vehicles, a determination result to outside the monitoring system.

7. A central monitoring apparatus for monitoring vehicles in order to sense the occurrence of an abnormality, comprising:
- a receiving unit which receives a sensing result from vibration sensing units each of which is provided in a different one of the vehicles in order to sense a vibration of that vehicle;
- a sensed time specifying unit for specifying a time at which a vibration is sensed by one of the vibration sensing units; and
- an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination based on sensing results obtained by the respective vibration sensing units of the vehicles within a predetermined time period and a result of specification by the sensed time specifying unit that more than one of the vibration sensing units senses a vibration within predetermined time period.

8. A central monitoring apparatus for monitoring vehicles in order to sense the occurrence of an abnormality, comprising:
- a receiving unit which receives a sensing result from vibration sensing units each of which is provided in a different one of the vehicles in order to sense a vibration of that vehicle;
- a sensed time specifying unit for specifying a time at which a vibration is sensed by one of the vibration sensing units; and
- an abnormality determining unit which determines, when one of the vehicles senses a vibration by the associated vibration sensing unit, whether the vibration is caused by preparations for theft vis-à-vis said one of the vehicles or the vibration is caused by environmental influences on said one of the vehicles, the abnormality determining unit performing a determination based on sensing results obtained by the respective vibration sensing units of the vehicles and a result of specification by the sensed time specifying unit; and
- a vehicle position specifying unit which specifies positions of the vehicles, the abnormality determining unit performing the determination further based on a result of specification by the vehicle position specifying unit.

9. The central monitoring apparatus as defined in claim 8, further comprising:
- a time information generating unit which generates time information indicating time; and a vibration determining unit which adjusts, when a vibration of one of the vehicles is sensed by the associated vibration sensing unit, determination standards for determining whether or not the vibration is ignored, based on a sensing result from said one of the vehicles, when the abnormality determining unit determines that a vibration of one of the vehicles sensed by the associated vibration sensing unit is caused by the environmental influences on said one of the vehicles, the vibration determination standard adjusting unit adjusting the determination standards, based on a result of specification by the sensed time specifying unit, a result of specification by the vehicle position specifying unit, and the time information.

10. The central monitoring apparatus as defined in claim 7, further comprising a reporting unit which reports, when the abnormality determining unit determines that a vibration sensed by one of the vehicles by the associated vibration sensing unit is caused by environmental influences on said one of the vehicles, a determination result to outside the apparatus.

11. An on-board monitoring apparatus which is attached to a vehicle being monitored by the central monitoring apparatus as defined in claim 7, comprising:
- the vibration sensing unit; and
- a transmitting unit which transmits a sensing result obtained by the vibration sensing unit.

12. An on-board monitoring apparatus which is attached to a vehicle and monitors the vehicle in order to sense the occurrence of an abnormality in the vehicle, comprising:
- a vibration sensing unit which senses a vibration of the vehicle; a receiving unit which receives a sensing result, which is obtained by a vibration sensing unit of another vehicle, from a central monitoring apparatus which collects and transmits the sensing result obtained by the vibration sensing unit of said another vehicle;
- a sensed time specifying unit which specifies times at which respective vibrations are sensed by the vibration sensing unit of the vehicle and the vibration sensing unit of said another vehicle; and
- an abnormality determining unit which determines, when the vehicle senses a vibration by the vibration sensing unit, whether the vibration is caused by preparations for theft vis-à-vis the vehicle or the vibration is caused by environmental influences on the vehicle, the abnormality determining unit performing a determination based on a sensing result obtained by the vibration sensing unit of the vehicle, the sensing result obtained by the vibration sensing unit of said another vehicle within a predetermined time period, and a result of specification by the sensed time specifying unit that more than one of the vibration sensing units senses a vibration within the predetermined time period.

13. A method of monitoring vehicles in order to sense the occurrence of an abnormality, comprising the steps of:
- (i) sensing a vibration of one of the vehicles by vibration sensing units each being attached to a different one of the vehicles;
- (ii) specifying, by a sensed time specifying unit, a time at which a vibration is sensed by one of the vibration sensing units; and
- (iii) when one of the vehicles senses a vibration by the associated vibration sensing unit, determining, by an abnormality determining unit, whether the vibration is caused by preparations for theft vis-à-vis said one of the vehicles or the vibration is caused by environmental influences on said one of the vehicles, the step (iii) being performed by the abnormality determining unit, based on sensing results obtained by the respective vibration sensing units of the vehicles within a predetermined time period and a result of specification by the sensed time specifying unit that more than one of the vibration sensing units senses a vibration within the predetermined time period.

14. A monitoring program for operating a central monitoring apparatus, the monitoring program comprising machine-readable program code on a medium for causing, when executed, the central monitoring apparatus to perform the following steps:
- receiving a sensing result from vibration sensing units each of which is provided in a different one of the vehicles in order to sense a vibration of that vehicle;

specifying a time at which a vibration is sensed by one of the vibration sensing units; and determining when one of the vehicles senses a vibration by the associated vibration sensing unit, whether the vibration is caused by preparations for theft vis-à-vis said one of the vehicles or the vibration is caused by environmental influences on said one of the vehicles, the determining based on the sensing results obtained by the respective vibration sensing units of the vehicles within a predetermined time period and a result of specification by the sensed time specifying unit that more than one of the vibration sensing units senses a vibration within the predetermined time period.

15. A computer-readable recording medium recording the monitoring program defined in claim 14.

* * * * *